United States Patent
Clementi et al.

(10) Patent No.: US 8,098,705 B2
(45) Date of Patent: Jan. 17, 2012

(54) RADIO FREQUENCY EXCITED GAS LASER SOURCE

(75) Inventors: Gabriele Clementi, Florence (IT); Leonardo Masotti, Florence (IT); Alberto Severi, Arezzo (IT)

(73) Assignee: EL. EN. S.p.A., Calenzano, Florence (IT)

( * ) Notice: Subject to any disclaimer, the term of this patent is extended or adjusted under 35 U.S.C. 154(b) by 30 days.

(21) Appl. No.: 12/665,476

(22) PCT Filed: Jun. 24, 2008

(86) PCT No.: PCT/IT2008/000426
§ 371 (c)(1),
(2), (4) Date: Dec. 18, 2009

(87) PCT Pub. No.: WO2009/001395
PCT Pub. Date: Dec. 31, 2008

(65) Prior Publication Data
US 2010/0189156 A1 Jul. 29, 2010

(30) Foreign Application Priority Data
Jun. 26, 2007 (IT) ................................ FI2007A0142

(51) Int. Cl.
*H01S 3/22* (2006.01)
*H01S 3/097* (2006.01)
(52) U.S. Cl. .......................................... 372/55; 372/87
(58) Field of Classification Search ................ 372/35, 372/55–66
See application file for complete search history.

(56) References Cited

U.S. PATENT DOCUMENTS

| | | | |
|---|---|---|---|
| 3,636,472 A | 1/1972 | Leonard et al. | |
| 4,438,514 A | 3/1984 | Chenausky et al. | |
| 4,719,639 A | 1/1988 | Tulip | |
| 4,737,964 A * | 4/1988 | Braski et al. ................. | 372/82 |
| 4,787,090 A | 11/1988 | Newman et al. | |
| 4,853,939 A | 8/1989 | Kokawa | |
| 5,123,028 A | 6/1992 | Hobart et al. | |
| 5,131,003 A | 7/1992 | Mefferd | |
| 5,131,004 A | 7/1992 | Dallarosa et al. | |
| 5,140,606 A | 8/1992 | Yarborough et al. | |
| 5,661,746 A | 8/1997 | Sukhman et al. | |
| 5,894,493 A | 4/1999 | Sukhman et al. | |
| 7,274,722 B2 * | 9/2007 | Taufenbach .................. | 372/61 |
| 7,693,207 B2 * | 4/2010 | Gutierrez ...................... | 372/55 |
| 2003/0231667 A1 * | 12/2003 | Byren et al. .................. | 372/35 |
| 2006/0029116 A1 * | 2/2006 | Shackleton et al. ........... | 372/55 |
| 2007/0263692 A1 * | 11/2007 | Taufenbach .................. | 372/55 |

FOREIGN PATENT DOCUMENTS

| | | |
|---|---|---|
| CN | 1219789 A | 6/1999 |
| DE | WO 94/15384 | 7/1994 |
| EP | 0 275 023 | 7/1988 |
| EP | 0 305 893 | 3/1989 |

* cited by examiner

*Primary Examiner* — Jessica Stultz
*Assistant Examiner* — Phillip Nguyen
(74) *Attorney, Agent, or Firm* — McGlew and Tuttle, P.C.

(57) ABSTRACT

There is described a gas laser comprising a pair of substantially mutually parallel and opposed electrodes (17, 37), between which a volume is defined containing a gas in which said electrodes generate a discharge. At opposed ends of the electrodes, in said volume, mirrors (65) are arranged to define a resonant cavity. The electrodes form an integral part of two portions (5, 7) of a sealed housing (1), containing the gas and in which the mirrors and the electrodes are housed. The two portions (5, 7) forming the housing are electrically connected.

39 Claims, 7 Drawing Sheets

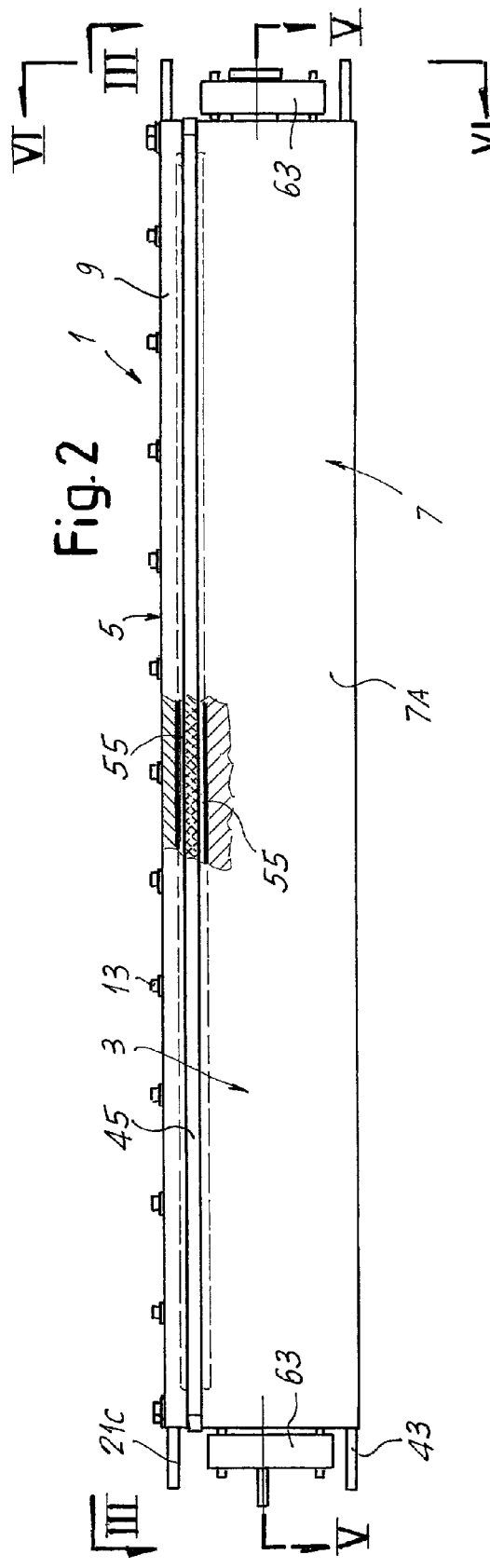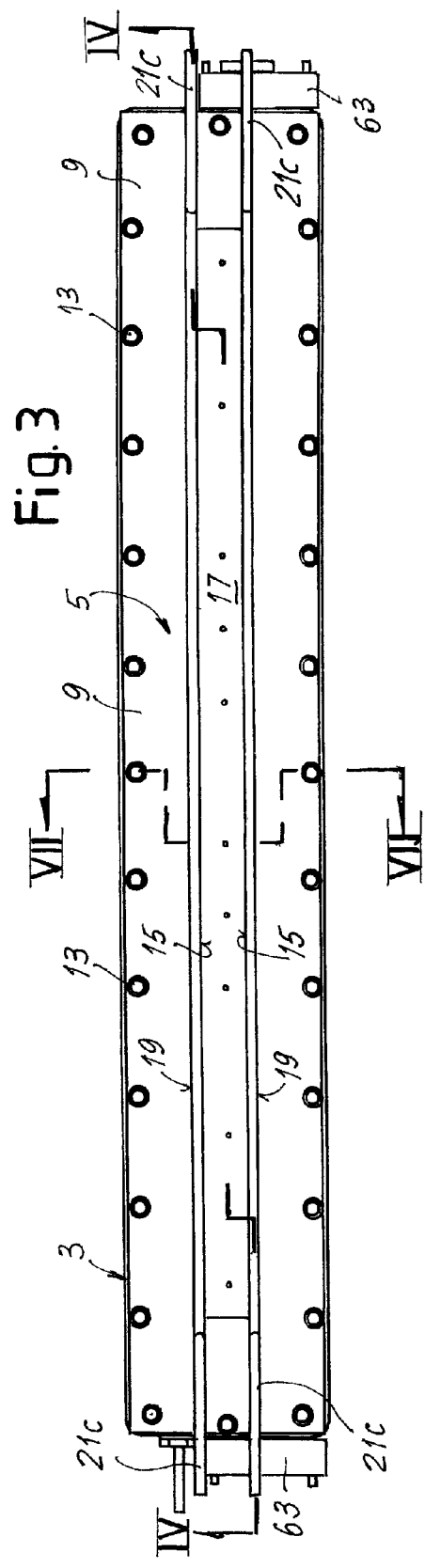

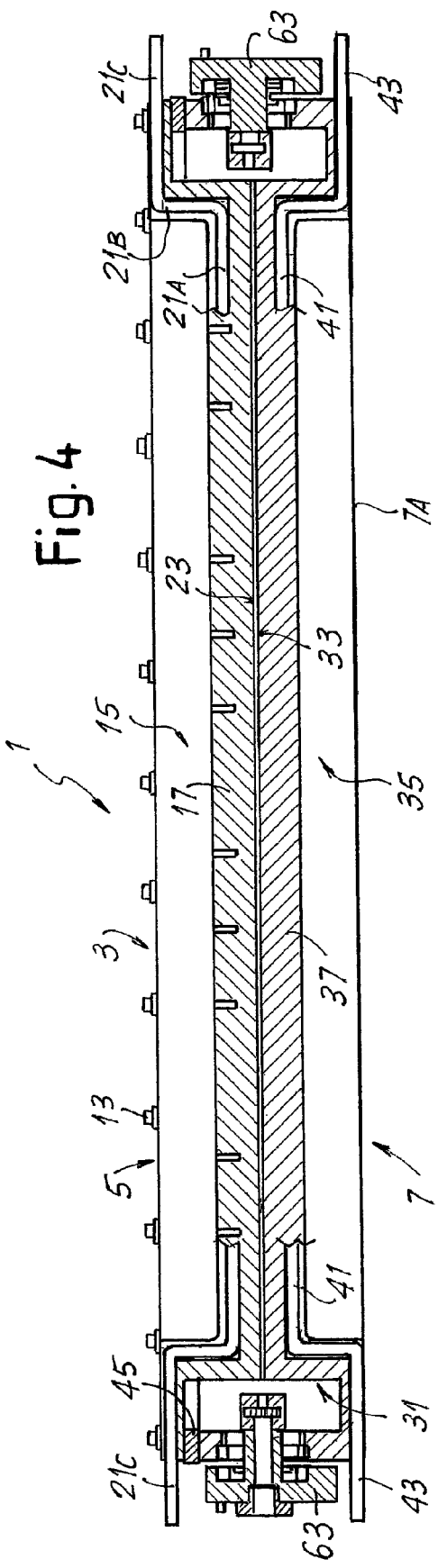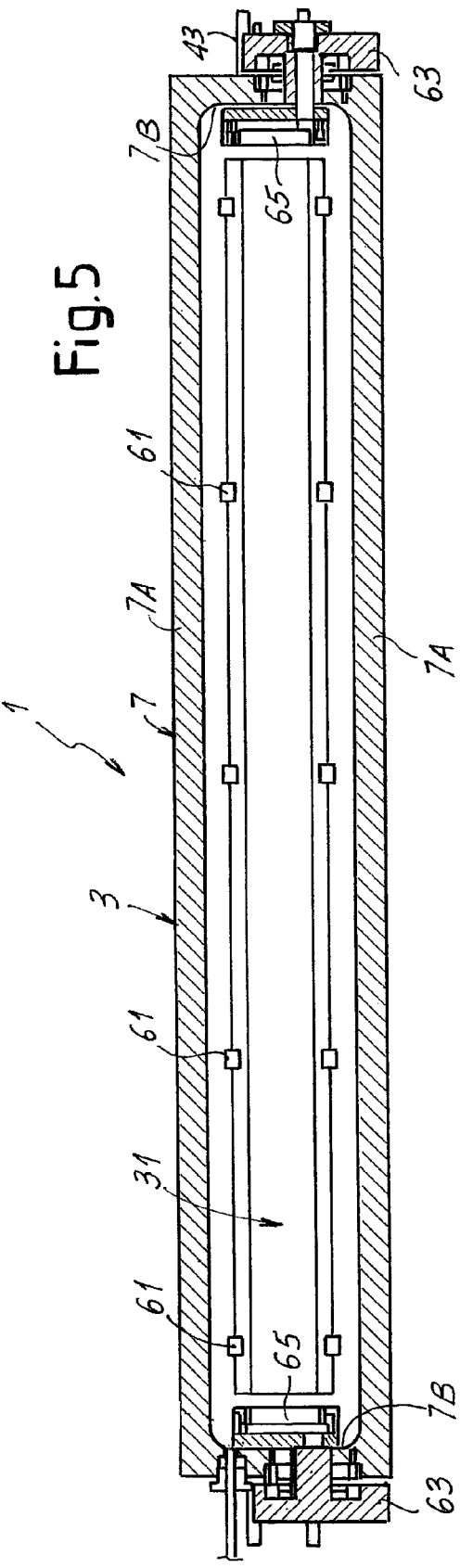

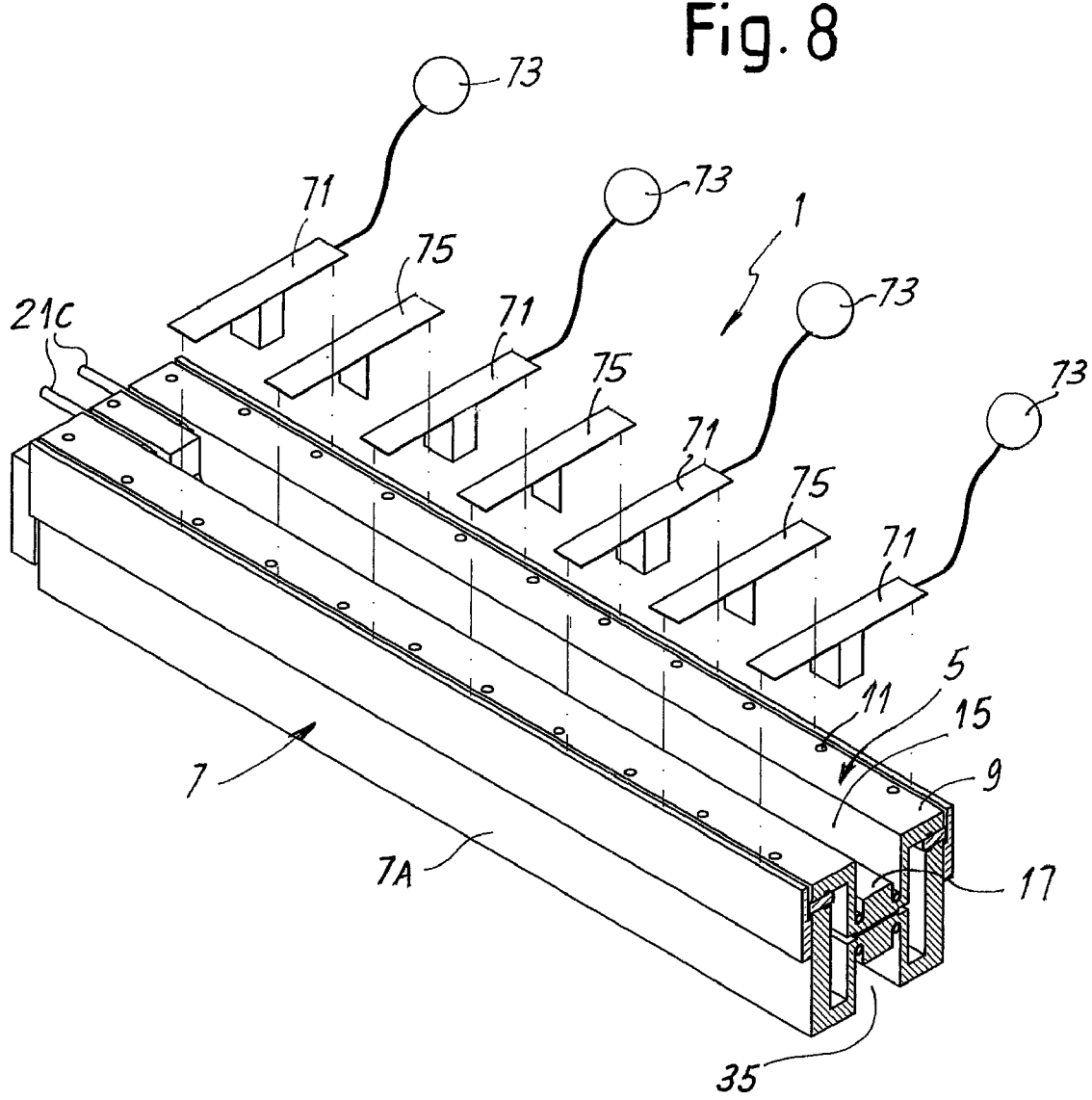

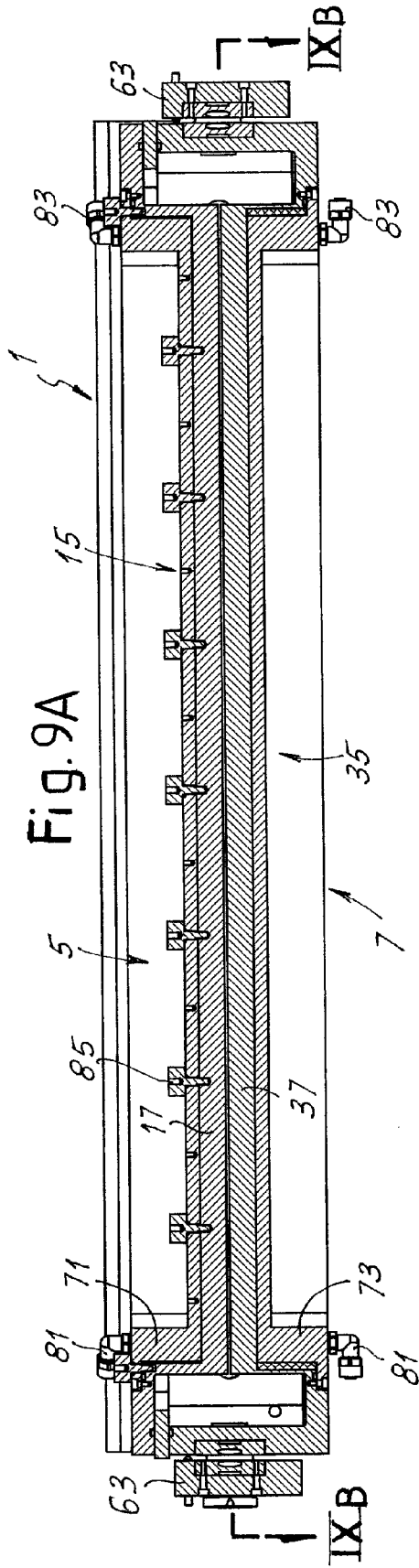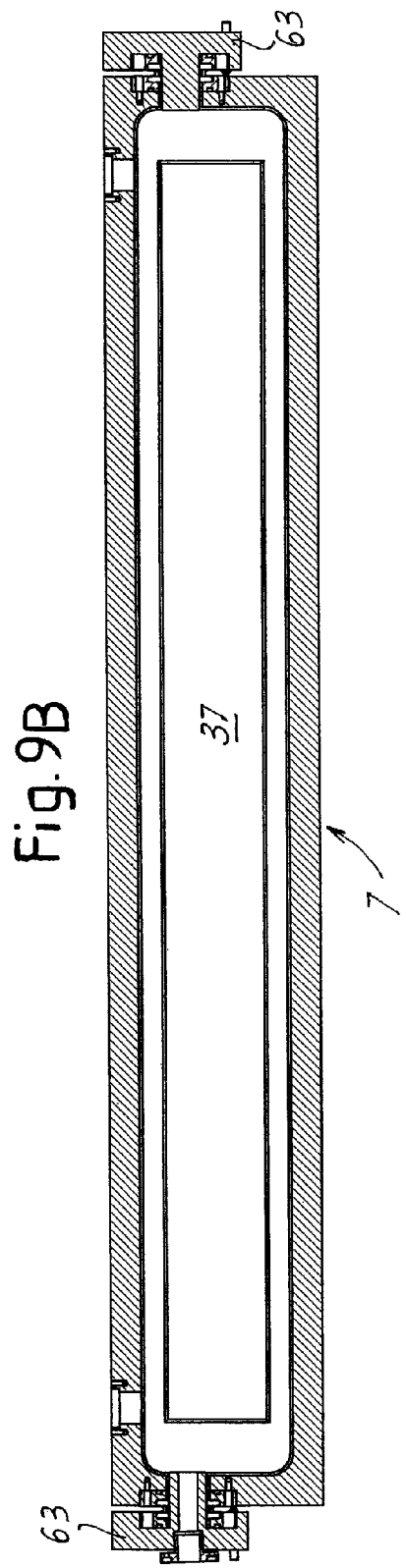

RADIO FREQUENCY EXCITED GAS LASER SOURCE

TECHNICAL FIELD

The present invention relates to a laser source and more in particular to a structure for a so-called radio frequency-excited laser source with an optical cavity having any configuration. Specifically, the invention relates to a radio frequency-excited gas laser, preferably $CO_2$ gas laser.

STATE OF THE ART

Among the many configurations of gas laser sources, lasers have been developed in which a gas (typically a mixture prevalently based on $CO_2$), is contained in a cavity defined between two elongated, mutually parallel rectangular slabs or plates, placed at a specific distance from one another. The two plates form two electrodes coupled to a radio frequency generator to generate a glow discharge in the gas contained in the space interposed between the two slabs. At the ends of the two slabs forming the electrodes mirrors are arranged, which define a resonant cavity. One of the mirrors is designed in a manner to extract from the resonant cavity a laser beam generated inside the cavity.

The system formed of the electrodes and of the mirrors defining the resonant cavity is housed inside a sealed chamber that insulates the volume containing the gas from the outside environment. The gas containing chamber is normally a cylindrical or prismatic chamber with two front walls carrying the mirrors and therein is arranged an electrode cooling system, in addition to the mirrors and the electrodes.

Laser sources of this type are disclosed, for example, in WO-A-9415384 and in the U.S. Pat. Nos. 5,123,028, 5,131, 003, 5,131,004, 5,140,606 and in other patents of the same family, and in the U.S. Pat. Nos. 5,661,746, 5,894,493, 4,787, 090, 4,438,514.

These known lasers have the drawback of requiring sealed feedthroughs in the wall of the chamber containing the electrodes and the mirrors, for supplying the power to the electrodes and the coolant. This causes a particularly complex and costly configuration, which is also susceptible to operating defects and faults, e.g. due to failure of one of the feedthrough seals.

EP-A-275023 describes a slab laser, in which the first and the second electrode are provided one on a box-shaped structure with a U-section and the other on a cover of said structure. However, it is not specified how the volume in which the gas is contained is enclosed. In this publication, the embodiment is described in an extremely schematic and brief manner. The box-shaped structure has a feedthrough for electrical power and cooling is obtained on one side of the structure only via ducts produced in the thickness of this structure, at a distance from the opposed surfaces of the electrodes, between which the discharge is generated.

EP-A-305893 describes a slab laser with flat laminar electrodes held at a specific mutual distance by suitable spacers and inside which a cooling system is provided by ducts formed inside the thickness of the electrodes.

OBJECTS AND SUMMARY OF THE INVENTION

An object of the present invention is to provide a radio frequency-excited gas laser with a structure that overcomes entirely or in part the drawbacks of prior art laser sources.

According to one aspect, in one embodiment the invention suggests a structure for radio frequency-excited laser which is particularly simple to produce and reliable and which solves problems related to insulation of the resonant cavities from the outside environment.

According to one embodiment of the invention, there is provided a radio frequency-excited gas laser source whose structure is configured so that the electrodes form an integral part of two portions of a sealed housing, containing the gas and in which the mirrors and the electrodes are housed. The two housing portions are electrically conductive and electrically insulated from each other.

With this solution the sealed housing inside which the gas is contained is formed by the same components that form the electrodes and an external container or housing is no longer necessary, making it unnecessary to produce feedthrough insulators for the power supply to the radio frequency generator and for the ducts to cool the electrodes.

In one embodiment, electrical insulation of the two portions that form the housing is obtained by an electrically insulating element. In one embodiment, this insulating element is made of ceramic, quartz, glass or another suitable material, preferably rigid and easy to machine, e.g. by laser cutting from a slab. In one embodiment, the insulating element has the shape of an elongated rectangular frame extending parallel to the two electrodes, which are also elongated in shape.

In one embodiment, the rectangular frame extends around one of the two electrodes, which is configured as an expansion of one of the two portions defining the housing of the laser source.

In one embodiment, the housing is box-shaped, with a substantially prismatic body and a cover. A first electrode is provided on the cover and a second electrode is provided on the box-shaped body.

In one embodiment, the housing has an elongated prismatic shape, at the ends of which the mirrors defining the resonant cavity are arranged.

In one embodiment the housing extends in a box-shape elongated according to a direction substantially parallel to the longitudinal extension of the electrodes and the mirrors are arranged at the terminal parts of the housing.

In one embodiment, the housing comprises an elongated prismatic body, from the bottom of which a hollow expansion extends toward the inside, where the cavity is accessible externally and the surface of said bottom facing the inside of the housing defines the surface of one of the two electrodes. In an embodiment, said body is closed by a cover with elongated extension, preferably rectangular in a plan view. The cover can have a perimeter flange. Preferably, said perimeter flange cooperates with an edge of the prismatic or box-shaped body and the electrically insulating element in the shape of a frame is interposed between said edge and the flange. Advantageously, sealing gaskets can be provided on the two opposed faces of the insulating element.

In a preferred embodiment, the cover has an expansion facing the inside of the housing and defining the other of the two electrodes. The surface of the bottom of this expansion, facing the inside of the housing, is arranged in front of the opposed electrode and thus defines the volume inside which the discharge is generated in the gas. Preferably, the expansion formed on the cover is also hollow and open toward the outside.

In a particularly advantageous embodiment of the invention, in one or preferably in both the hollow expansions forming the two opposed electrodes of the laser source, there is housed a cooling circuit which can be formed by ducts which are arranged entirely external to the cavity containing the gas. In this way, it is not necessary to provide feedthroughs for the cooling ducts. The entire cooling circuit is housed outside the gas-containing cavity.

In a particularly advantageous embodiment, the cooling ducts are shaped so as to extend inside seats excavated in the wall that defines the respective electrode. In this way, efficient cooling of the electrode is attained, by placing the cooling ducts in proximity of the inner surface forming the face of the electrode on which the discharge is generated.

In one embodiment, one of the two portions of the housing is maintained at ground potential, while the other is associated with a radio frequency power supply system. Said radio frequency power supply system can comprise one or more radio frequency generators with respective adaptation networks mutually adjacent along the longitudinal extension of the housing. Balancing inductors are also arranged along the housing of the laser source. In a preferred embodiment of the invention, the balancing inductors are at least partly housed inside the expansion forming the respective electrode. In this way it is not necessary to provide any feedthrough in the wall of the housing for the radio frequency power supply.

Further advantageous characteristics and embodiments of the invention are indicated in the appended claims and will be described in greater detail below, with reference to the preferred embodiment of the invention.

BRIEF DESCRIPTION OF THE DRAWINGS

The invention will be better understood by following the description and accompanying drawing, which shows practical non-limiting embodiments of the invention. More in particular, in the drawing:

FIG. 2 shows a side view of the assembled source;

FIG. 3 shows a plan view according to of FIG. 2;

FIG. 4 shows a section according to IV-IV of FIG. 3;

FIG. 5 shows a section according to V-V of FIG. 2;

FIG. 8 shows an exploded view showing assembly of the balancing inductors, of the adaptation networks and of the radio frequency generators on the structure of the laser source;

FIG. 9A shows a longitudinal section of a structure of the laser source in an improved embodiment;

FIG. 9B shows a section according to the line IXA-IXA of FIG. 9A; and

DETAILED DESCRIPTION OF AN EMBODIMENT OF THE INVENTION

Figure 1:
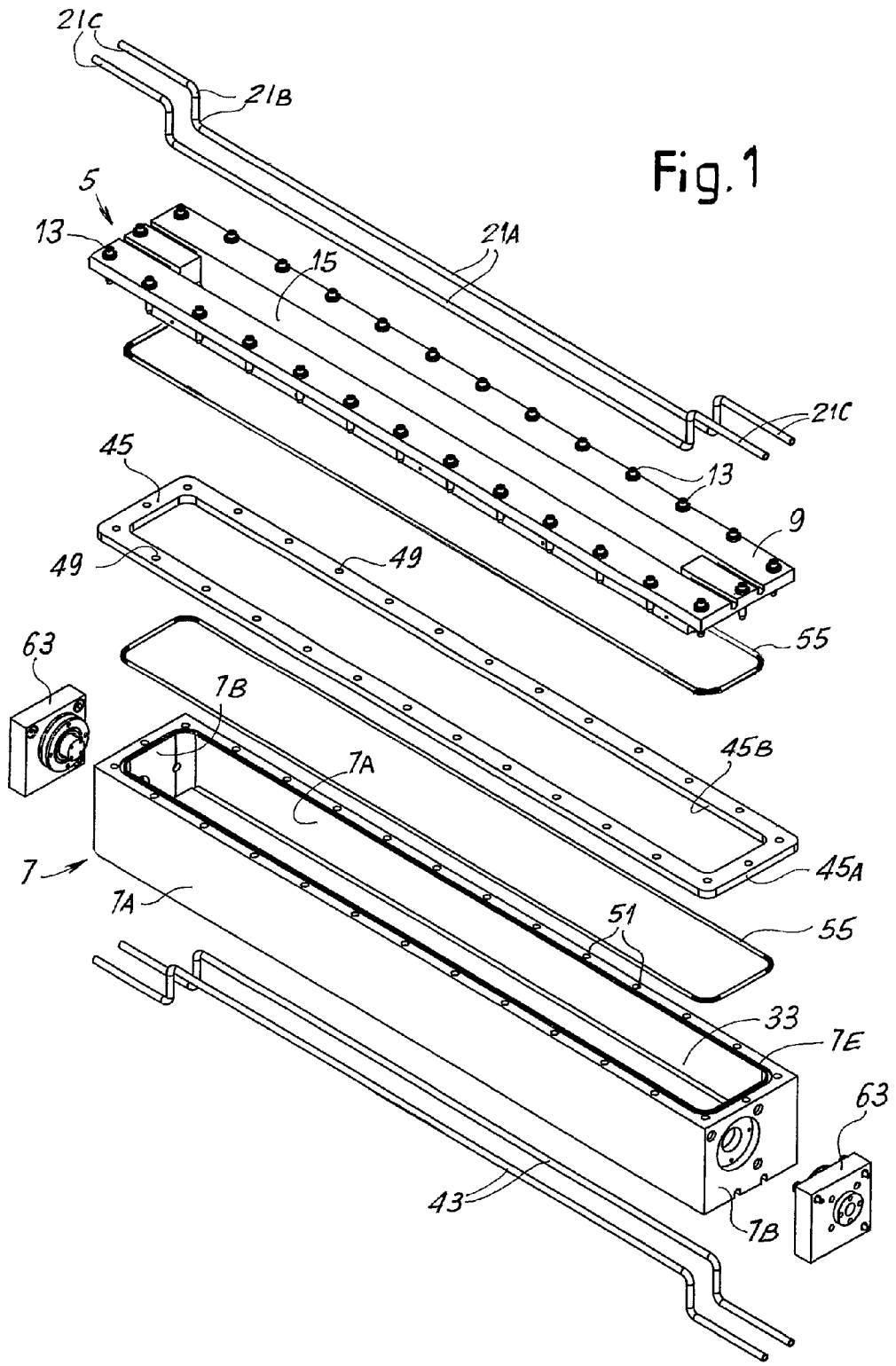
FIG. 1 shows an exploded view of the laser source structure according to the invention.
Figure 7:
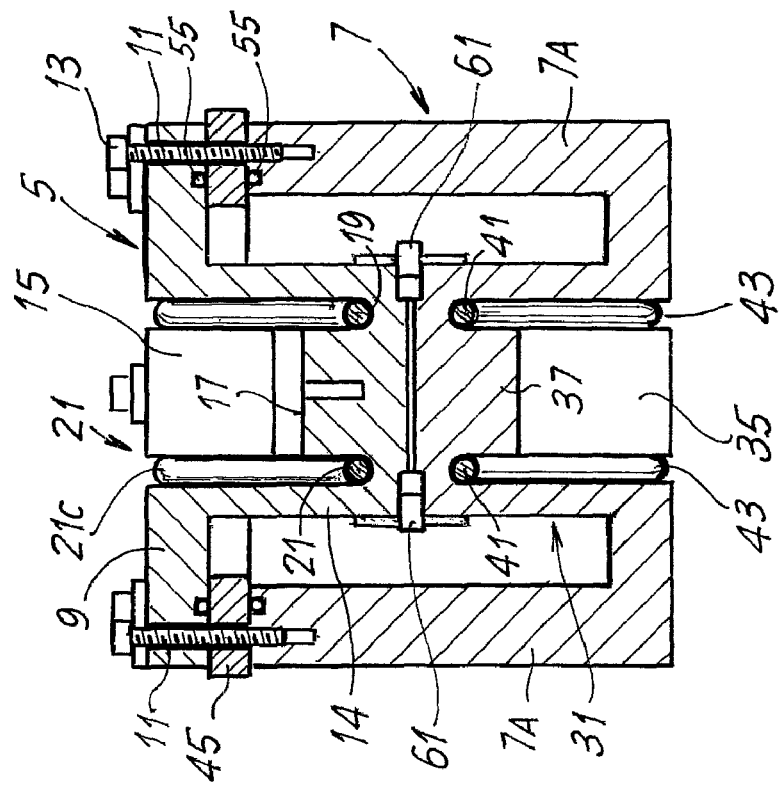
FIG. 7 shows a cross section according to VII-VI of FIG. 3.
Figure 6:
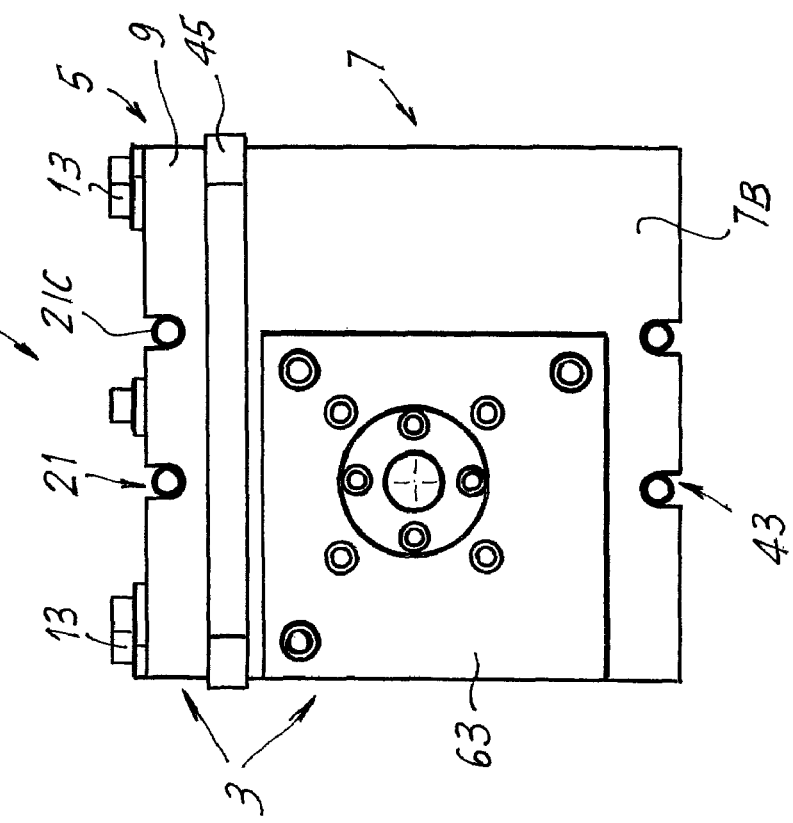
FIG. 6 shows a front view according to VI-VI of FIG. 2.

In the embodiment shown in FIGS. 1 to 8, the laser source, indicated as a whole with 1, comprises a housing 3 including a first portion 5 with a substantially rectangular plan shape, and a second portion 7 with a substantially hollow prismatic shape, with dimensions in plan view which are substantially the same as the first portion 5.

More in particular, in one embodiment of the invention, the portion 5 comprises a perimeter edge defined by a flange 9 with substantially rectangular shape with through-holes 11 (see in particular FIG. 7) in which clamping screws 13 engage to connect the portion 5 to the opposed portion 7 of the housing 3.

Inside the elongated rectangular extension of the flange 9 the portion 5 has an expansion 14 substantially with an elongated prismatic shape. The expansion 14 is internally hollow and defines a space or cavity 15 extending substantially in the shape of a parallelepiped, the bottom wall of which is indicated with 17. The space or cavity 15 is open toward the outside. On the surface of the bottom wall 17 facing the inside of the cavity 15 two parallel grooves 19 are provided, inside which two ducts 21 are housed, for example made of copper, for circulation of a coolant, as explained in greater detail below. Each duct 21 (see in particular FIG. 1) is shaped with a rectilinear intermediate portion 21A that is inserted in the corresponding seat or groove 19 provided in the wall 17. The rectilinear portions 21A are connected through curves 21B at two terminal ends 21C, with which each of the ducts 21 is connected to a cooling circuit, not shown.

On the opposite surface to that in which the seats or grooves 19 are provided, the wall 17 is machined to define a surface 23 useful to support a glow discharge that forms between the surface 23 and an opposed and parallel surface provided, in the manner described below, in the portion 7 of the housing 3. In a possible embodiment, the surface 23 can be machined to be reflecting, although this is not strictly necessary.

In substance, the expansion 14 described above forms a first electrode of the pair of electrodes with which the structure of the laser source 1 is equipped and between which a discharge is generated by means of a radio frequency generator described below.

The portion 7 of the housing 3 is shaped substantially as a hollow parallelepiped in the form of a tank with long side walls 7A, front walls 7B and a bottom wall from which a prismatic shaped expansion 31 extends toward the inside of the box-shaped portion 7, the front surface 33 said expansion having a shape substantially the same as that of the surface 23 provided on the opposed expansion 14. The surface 33 is machined in a similar manner to the surface 23.

In the same way as is provided for the expansion 14, the expansion 31 of the portion 7 is internally hollow and has a cavity or space 35 open toward the outside, with an elongated prismatic shape similar to the cavity 15. The cavity is delimited by a bottom wall 37, which defines with a face thereof the aforesaid surface 33 inside the housing 3 and with an opposed face a surface 39 outside the housing 3. In the same way as the surface 17 of the expansion 14, the surface 39 has two substantially rectilinear seats or grooves 41, in which cooling ducts 43 are housed, substantially the same shape as the ducts 21, also made, for example, of copper. Both the ducts 43 and the ducts 21 can be provided in different numbers, for example a single duct or more than two ducts for each part of the structure for housing the resonant cavity of the laser.

The thermal connection between the cooling ducts and the walls 17 and 37 in which the seats for housing them are produced can be increased using a thermally conductive glue. The particular arrangement of the ducts 21, 43 in the seats provided in the walls of the electrodes allow the coolant to be taken in close proximity of the surfaces of the electrodes from which heat must be removed.

The two portions 5 and 7 of the housing 3 are mutually coupled with interposition of an electrically insulating element 45. In the embodiment shown, the insulating element 45 has the shape of a substantially elongated rectangular frame with a dimension approximately corresponding to that of the flange 9 of the portion 5 of the housing 3. The frame 45 therefore has a rectangular outer edge 45A and a rectangular inner edge 45B. Between said two substantially concentric edges through-holes 49 are provided for the screws 13, which engage in threaded holes 51 (FIG. 1) provided along a perimeter edge of the portion 7. In this way, by means of the screws 13 the portions 5 and 7 can mutually couple with interposition of the insulating element 45, so that the two portions 5 and 7, made of electrically conductive material, such as aluminum, can be maintained at different potentials.

When the portions 5 and 7 are mutually coupled with interposition of the frame 45 they define a volume for containing the gas, for example $CO_2$ or a mixture of $CO_2$ with other gases, at a pressure sufficient to generate and maintain therewithin the glow discharge produced by the electrodes. The electrodes, formed by the expansions 14 and 31 of the portions 5 and 7, are housed inside this volume defined by the portions 5 and 7.

In this way, both the housing that insulates the volume containing the gas in which the glow discharge is generated and the electrodes that generate this discharge are formed by these portions 5 and 7. To ensure improved seal between the inside and the outside of the volume defined by the portions 5 and 7, gaskets 55 are arranged between the frame 45 and the portions 5 and 7. In a preferred embodiment, the flange 9 has a seat 9A with substantially rectangular extension and with a semi-circular cross section for a first gasket 55, which is pressed against the corresponding surface of the frame 45. A second seat 7A is provided along the edge 7D of the portion 7, to house a second gasket 55 the same shape as the first gasket and cooperating with the opposed surface of the frame 45.

In a possible embodiment, in an assembled arrangement the opposed flat surfaces 23 and 33 of the electrodes formed by the expansions facing the inside of the portions 5 and 7 are maintained at a correct distance from one another by spacer elements 61 made of insulating material, positioned along the edges of the surfaces 23 and 33 at suitable distance. However, these spacer elements can be omitted and the correct reciprocal distance between the opposed surfaces of the electrodes can be obtained by manufacturing the insulating frame 45, and the surfaces with which it comes into contact, with the necessary precision.

Associated with the opposed faces 7B of the portion 7 are plates 63, which carry mirrors 65 defining a resonant cavity, reflected inside which is the light radiation generated in the gas contained in the housing 3 as a result of the glow discharge between the opposed surfaces 23 and 33 of the two electrodes of the laser source. The shape of the mirrors 65 is of a type known per se and is not described in detail herein. It can differ from that illustrated and any shape of mirrors compatible with the other characteristics of the resonant cavity can be used. In general, the mirrors are equipped with means for adjusting their tilt angle and with a system for extracting the light radiation from one side of the resonant chamber.

The cavities 15 and 35 of the two prismatic expansions 14, 31 forming the opposed electrodes of the laser source are not only used to house the cooling ducts 21 and 43, but also (for the portion 7) to house one or more adaptation networks 71 (see FIG. 8) associated with one or more radio frequency generators 73 and arranged, for example, along the longitudinal extension of the cavity inside the expansion 14. Besides the adaptation networks 71, the cavity also houses one or more balancing inductors 75. In the embodiment shown in FIG. 8, several generators and several adaptation networks are provided, with balancing inductors intercalated between pairs of adaptation networks. However, different configurations are also possible, for example with a single generator and/or a single adaptation network and a different arrangement of balancing inductors.

From the description above it is clear that, with the embodiment according to the invention, it is possible to obtain a container, pneumatically insulated with respect to the outside environment, inside which the gas in which the discharge is generated is contained, without the need to produce feedthroughs in the container for the power supply to the electrodes and for circulation of the coolant. The shape of the two portions 5 and 7 of the housing 3, which form the two internally hollow expansions defining the two electrodes allows housing of the cooling circuit without passing through the walls of the gas container and housing of the balancing inductors associated with the radio frequency generator(s) also in this case without passing through the walls delimiting the resonant cavity inside which the gas is contained.

Figure 10:
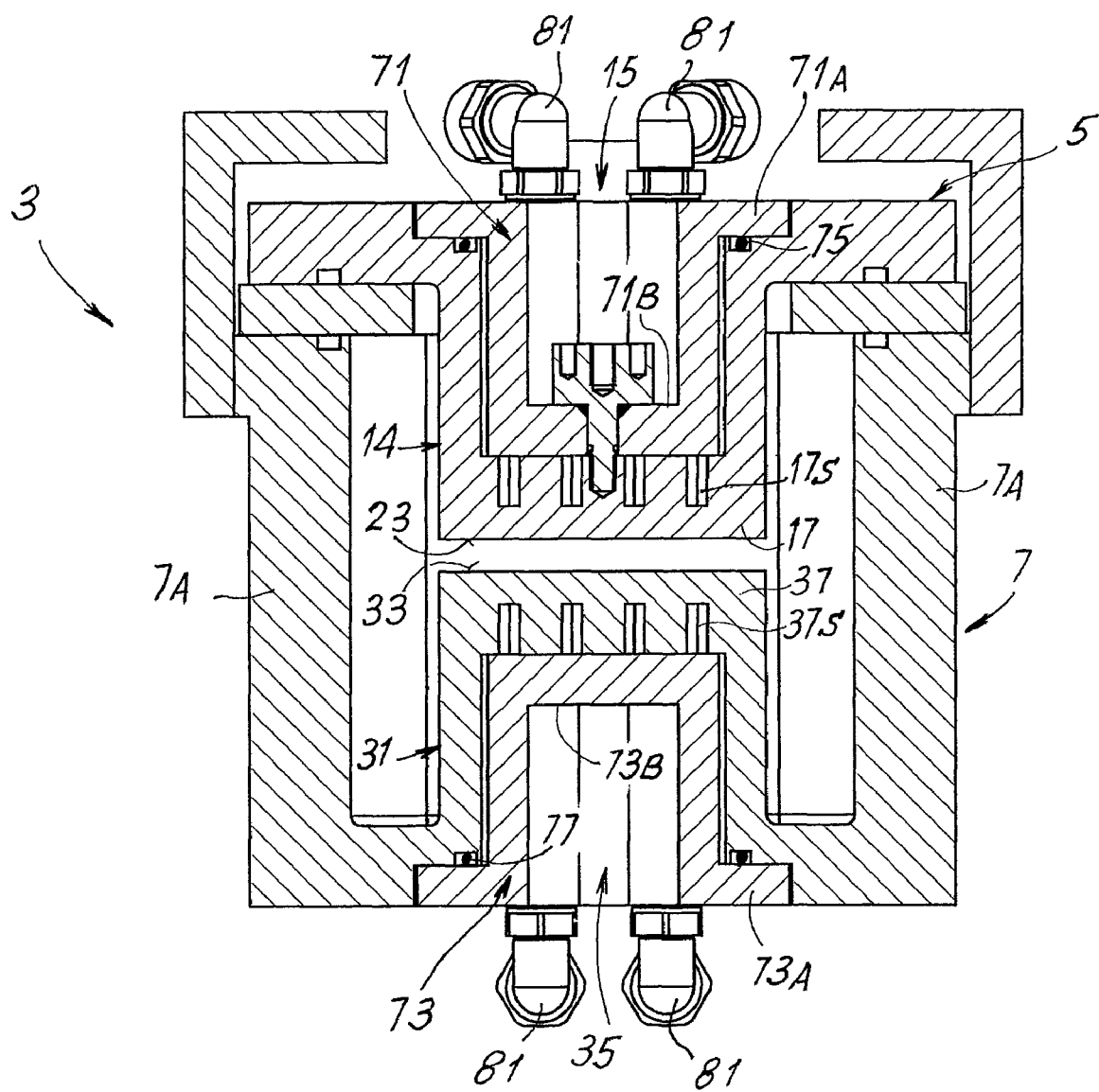
FIG. 10 shows a cross section according to X-X of FIG. 9.

FIGS. 9A, 9B and 10 show a modified embodiment, in which even more efficient thermal exchange and, consequently, heat removal is achieved. The same numbers indicate the same or equivalent parts to those of the embodiment of FIGS. 1 to 8.

In this improved embodiment, two inserts, 71 and 73 respectively, are housed inside the two cavities 15 and 35. The two inserts 71, 73 have rectangular flanges 71A, 73A which, with the aid of gaskets 75, 77, form a liquid-tight closure between the outside and an inner cavity delimited between each insert 71, 73 and the inner surface of the respective cavity 15, 35 in which the insert is housed. Moreover, the inner walls 17 and 37 of the expansions 14 and 31 have grooves 17S and 37S, which extend approximately for the entire longitudinal extension of the walls 17 and 37. These grooves are closed by the bottom walls 71B, 73B of the respective inserts 71 and 73. In this way, channels for circulation of coolant are formed, formed directly in the metal material (typically aluminum) that forms the electrodes. Therefore, the coolant circulates in close proximity of the opposed surfaces 23 and 33 of the two electrodes of the source, so as to allow removal, with maximum efficiency, of the heat generated by the discharge in the gas.

The coolant is fed into the channels formed by the grooves 17S and 37S through pairs of connectors 81, 83 disposed at the ends of the cavities 15 and 35. The number of the grooves 17S, 37S and of the connectors 81, 83 can vary with respect to that represented in FIGS. 9 and 10. In any case, it will be chosen so as to optimize heat removal.

The number 85 indicates clamping screws of the balancing inductors 75, which pass through through-holes in the bottom wall 71 and engage with the electrode below formed by the wall 17.

It is understood that the drawing only shows an example provided by way of a practical arrangement of the invention, which may vary in forms and arrangements without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A gas laser comprising:
    a pair of substantially mutually parallel and opposed electrodes, between which a volume is defined, said volume containing a gas in which said electrodes generate a discharge;
    at opposed ends of said electrodes, in said volume, mirrors to define a resonant cavity, wherein said electrodes form an integral part of two portions of a sealed housing, containing said gas and in which said mirrors and said electrodes are housed, each of said electrodes having a substantially elongated rectangular extension and each of said electrodes having a flat surface, said flat surfaces being mutually parallel and delimiting said volume containing the gas, said two housing portions being electrically insulated from each other by means of an insulating element arranged between said two housing portions, wherein a first of said housing portions has a first perimeter edge and a second of said housing portions has a second perimeter edge, said two perimeter edges being mutually coupled with interposition of said electrically insulating element.

2. A laser as claimed in claim 1, wherein said electrically insulating element has a shape substantially of an elongated rectangular frame.

3. A laser as claimed in claim 2, wherein said elongated rectangular frame extends around one of said electrodes.

4. A laser as claimed in claim 1, wherein said housing has a box-shaped extension elongated according to a direction substantially parallel to the longitudinal extension of said electrodes and said mirrors are arranged at terminal walls of said housing.

5. A laser as claimed in claim 1, wherein said electrodes are formed by expansions facing the inside of said housing, each of said expansions being carried by one of said two housing portions.

6. A laser as claimed in claim 5, wherein each of said expansions is produced in one piece by the corresponding housing portion.

7. A laser as claimed in claim 5, wherein one or more of said expansions are internally hollow and open toward the outside of the housing.

8. A laser as claimed in claim 7, further comprising a cooling system housed in said one or more internally hollow expansions.

9. A laser as claimed in claim 8, wherein said cooling system has ducts housed in grooves formed in walls of said housing, forming said electrodes, of said one or more internally hollow expansions.

10. A laser as claimed in claim 8, wherein said cooling system has longitudinal channels formed in walls of said housing, forming said electrodes, of said one or more internally hollow expansions.

11. A laser as claimed in claim 10, wherein said channels have a depth greater than half a thickness of the walls forming said electrodes.

12. A laser as claimed in claim 1, wherein at least a sealing gasket is arranged between said two perimeter edges.

13. A laser as claimed in claim 1, further comprising:
a first sealing gasket between said first perimeter edge and said electrically insulating element; and
a second sealing gasket between said second perimeter edge and said electrically insulating element.

14. A laser as claimed in claim 1, wherein said first perimeter edge surrounds an elongated rectangular expansion, forming a first of said two electrodes.

15. A laser as claimed in claim 1, wherein said first perimeter edge comprises a substantially elongated rectangular flange.

16. A laser as claimed in claim 15, wherein said flange is substantially parallel to said electrodes.

17. A laser as claimed in claim 15, wherein said substantially elongated rectangular flange extends around a first expansion defining a first of said electrodes, which extends from said flange toward the inside of said second housing portion.

18. A laser as claimed in claim 17, wherein the second of said housing portions has a box-shaped body coupled along the second perimeter edge and a second expansion extends from the bottom of said box-shaped body, extending toward the first housing portion and defining a second of said electrodes.

19. A laser as claimed in claim 18, wherein said first expansion and said second expansion have substantially elongated rectangular cross sections.

20. A laser as claimed in claim 17, wherein said first expansion is internally hollow and a first cooling system is housed inside said first expansion.

21. A laser as claimed in claim 20, wherein said first cooling system comprises ducts for circulation of a coolant.

22. A laser as claimed in claim 20, wherein said first expansion has an inner cavity open toward the outside environment on the side opposed to the first electrode.

23. A laser as claimed in claim 22, wherein said first expansion is shaped substantially as a parallelepiped with a rectangular section, with an elongated base forming the first electrode and open on a side opposed to said base.

24. A laser as claimed in claim 23, wherein said elongated base has grooves inside which ducts of said first cooling system are housed.

25. A laser as claimed in claim 23, wherein said elongated base has grooves closed toward the outside forming ducts for circulation of the coolant of said first cooling system.

26. A laser as claimed in claim 18, wherein said second expansion is internally hollow and a second cooling system is housed inside said second expansion.

27. A laser as claimed in claim 26, wherein said second cooling system comprises ducts for circulation of a coolant.

28. A laser as claimed in claim 26, wherein said second expansion has an internal cavity open toward an outside environment on the side opposed to the second electrode.

29. A laser as claimed in claim 28, wherein said second expansion is shaped substantially as a parallelepiped with a rectangular section, with an elongated base forming the second electrode and open on a side opposed to said base.

30. A laser as claimed in claim 29, wherein said elongated base has grooves inside which ducts of said second cooling system are housed.

31. A laser as claimed in claim 30, wherein said elongated base has grooves closed toward the outside forming ducts for circulation of the coolant of said first cooling system.

32. A laser as claimed in claim 18, wherein said box-shaped body carries said mirrors, on walls substantially orthogonal to the longitudinal extension of said electrodes.

33. A laser as claimed in claim 8, wherein a radio frequency excitation system is housed inside at least one of the hollow expansions.

34. A laser as claimed in claim 33, wherein said radio frequency excitation system comprises a plurality of balancing inductors aligned along the longitudinal extension of said electrodes.

35. A laser as claimed in claim 33, wherein said radio frequency excitation system comprises one or more adaptation networks housed in said hollow expansion.

36. A gas laser comprising:
a pair of substantially mutually parallel and opposed electrodes, between which a volume is defined, said volume containing a gas in which said electrodes generate a discharge;
at opposed ends of said electrodes, in said volume, mirrors to define a resonant cavity, wherein said electrodes form an integral part of two portions of a sealed housing, containing said gas and in which said mirrors and said electrodes are housed, each of said electrodes having a substantially elongated rectangular extension and each of said electrodes having a flat surface, said flat surfaces being mutually parallel and delimiting said volume containing the gas, said two housing portions being electrically insulated from each other by means of an insulating element arranged between said two housing portions, wherein said electrodes are formed by expansions facing the inside of said housing, each of said expansions being carried by one of said two housing portions and wherein one or more of said expansions are internally hollow and open toward the outside of the housing; and a cooling system housed in said one or more internally hollow expansions, wherein a radio frequency excitation system is housed inside at least one of the hollow expansions.

37. A laser as claimed in claim 36, wherein said radio frequency excitation system comprises a plurality of balancing inductors aligned along the longitudinal extension of said electrodes.

38. A laser as claimed in claim 36, wherein said radio frequency excitation system comprises one or more adaptation networks housed in said hollow expansion.

39. A gas laser comprising:
a first electrode;
a second electrode, said first electrode being substantially parallel to said second electrode, said first electrode being substantially opposite said second electrode, said first electrode and said second electrode defining at least a portion of a volume, said volume being located at least between said first electrode and said second electrode, said volume comprising a gas, said first electrode and said second electrode generating a discharge in said volume;

a first mirror arranged adjacent to one end of one of said first electrode and said second electrode;

a second mirror arranged adjacent to one end of another one of said first electrode and said second electrode, said first mirror and said second mirror defining at least a portion of a resonant cavity, said first electrode and said second electrode forming an integral part of two housing portions of a sealed housing, said sealed housing containing said gas, said first mirror, said second mirror, said first electrode and said second electrode being arranged in sealed housing, each of said first electrode and said second electrode having a substantially elongated rectangular extension and each of said first electrode and said second electrode having a flat surface, said flat surface of said first electrode being parallel to said flat surface of said second electrode, said flat surface of said first electrode and said flat surface of said second electrode defining a portion of said volume, said two housing portions being electrically insulated from each other via an insulating element, said insulating element being arranged between said two housing portions, one of said housing portions having a first perimeter edge, another one of said housing portions having a second perimeter edge, said first perimeter edge being connected to said second perimeter edge, said electrically insulating element being arranged between said first perimeter edge and said second perimeter edge.

* * * * *